(12) United States Patent
Yoshimura et al.

(10) Patent No.: US 7,682,084 B2
(45) Date of Patent: *Mar. 23, 2010

(54) BEARING AND SCREW COMPRESSOR

(75) Inventors: Shoji Yoshimura, Takasago (JP);
Yasushi Amano, Takasago (JP); Takao Ohama, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 961 days.

This patent is subject to a terminal disclaimer.

(21) Appl. No.: 11/249,632

(22) Filed: Oct. 14, 2005

(65) Prior Publication Data

US 2006/0165335 A1 Jul. 27, 2006

Related U.S. Application Data

(63) Continuation-in-part of application No. 10/887,842, filed on Jul. 12, 2004, now Pat. No. 7,140,779.

(30) Foreign Application Priority Data

Jul. 18, 2003 (JP) .............................. 2003-276809
Aug. 27, 2003 (JP) .............................. 2003-303401
Oct. 18, 2004 (JP) .............................. 2004-303343

(51) Int. Cl.
*F16C 17/06* (2006.01)
*F16C 17/10* (2006.01)
*F16C 33/20* (2006.01)

(52) U.S. Cl. ...................... 384/306; 384/307; 384/448
(58) Field of Classification Search ................ 384/152, 384/278, 297–299, 300, 306–308, 624, 448; 62/197, 505, 469–470; 418/84, 177–179, 418/203, 106.1
See application file for complete search history.

(56) References Cited

U.S. PATENT DOCUMENTS

| 3,467,300 | A | * | 9/1969 | Schibbye | 418/201.1 |
| 3,913,346 | A | * | 10/1975 | Moody et al. | 62/197 |
| 4,501,505 | A | * | 2/1985 | Chambers | 384/152 |
| 4,983,106 | A | * | 1/1991 | Wright et al. | 418/2 |
| 5,007,745 | A | * | 4/1991 | Ball et al. | 384/307 |
| 5,207,568 | A | * | 5/1993 | Szymaszek | 418/203 |
| 5,211,026 | A | * | 5/1993 | Linnert | 62/175 |

(Continued)

FOREIGN PATENT DOCUMENTS

JP 48-65335 9/1973

(Continued)

OTHER PUBLICATIONS

Takao Ohama, et al., High-pressure Oil-flooded Screw Compressors [EH Serie], R&D Kobe Steel Technical Report., vol. 49, No. 1, Apr. 1999, pp. 32-35.

*Primary Examiner*—Marcus Charles
(74) *Attorney, Agent, or Firm*—Oblon, Spivak, McClelland, Maier & Neustadt, L.L.P.

(57) ABSTRACT

In a bearing constituted by a plural-layer slide member, the plural-layer slide member comprises a resin layer of polytetrafluoroethylene as a slide member and a backing strip to which the resin layer is bonded. A fitting hole having a depth exceeding the thickness of the resin layer is formed from the resin layer side. A temperature measuring metallic member formed of a white metal is fitted in the fitting hole. A temperature sensor is positioned within the temperature measuring metallic member. This bearing permits an accurate detection of its temperature. Further, in an oil cooled screw compressor having a bearing lubricating oil supply pipe, a slide surface of the bearing is covered with polyether ether ketone. Even if foaming occurs in the oil, it is possible to prevent the occurrence of a mechanical trouble such as galling.

7 Claims, 13 Drawing Sheets

U.S. PATENT DOCUMENTS

| | | | | |
|---|---|---|---|---|
| 5,626,470 A * | 5/1997 | Gerhardt | ............. | 418/84 |
| 5,821,204 A | 10/1998 | Kayo et al. | | |
| 6,059,551 A * | 5/2000 | Amano et al. | ............. | 418/84 |
| 6,312,239 B1 * | 11/2001 | Kirsten | ............. | 418/201.1 |
| 6,884,049 B2 * | 4/2005 | Hida et al. | ............. | 418/178 |
| 2002/0134101 A1 * | 9/2002 | Gennami et al. | ............. | 62/469 |
| 2002/0192096 A1 | 12/2002 | Segers et al. | | |
| 2003/0108446 A1 * | 6/2003 | Hida et al. | ............. | 418/201.1 |

FOREIGN PATENT DOCUMENTS

| | | |
|---|---|---|
| JP | 56-74632 | 6/1981 |
| JP | 59176489 A * | 10/1984 |
| JP | 60-121309 | 6/1985 |
| JP | 60-252819 | 12/1985 |
| JP | 5-164626 | 6/1993 |
| JP | 8-224805 | 9/1996 |
| JP | 10122245 A * | 5/1998 |
| JP | 11-294364 | 10/1999 |
| JP | 2000-186688 | 7/2000 |
| JP | 2002-168242 | 6/2002 |
| JP | 2002-194380 | 7/2002 |
| JP | 2002188586 A * | 7/2002 |
| JP | 2003-21135 | 1/2003 |
| JP | 2003-519760 | 6/2003 |

* cited by examiner

BEARING AND SCREW COMPRESSOR

The present application is a continuation-in-part of U.S. patent application Ser. No. 10/887,842, filed on Jul. 12, 2004, now U.S. Pat. No. 7,140,779.

BACKGROUND OF THE INVENTION

1. Field of the Invention

The present invention relates to an improvement of a bearing and a screw compressor and more particularly to a bearing capable of detecting a temperature and a screw compressor having the bearing. Especially, the present invention is concerned with an oil cooled screw compressor of the type in which oil after separation and recovery from discharge gas is supplied as lubricating oil.

2. Description of the Related Art

A screw compressor has a casing for housing therein a pair of female and male screw rotors meshed with each other. End portions of rotor shafts of each of the pair of screw rotors are supported by radial bearings. On the other hand, in each of the pair of female and male screw rotors, a pair of tilting pad thrust bearings for bearing a thrust force developed on the screw rotor are mounted at the end portion of one rotor shaft. The tilting pad thrust bearings are disposed on both sides of a disc-like thrust member fitted on the end portion of one rotor shaft in each of the pair of screw rotors and are provided with plural pads (hereinafter referred to as "thrust bearings") which, in a sliding contact with a slide surface of the thrust member, undergo the thrust force transmitted from the screw rotor to the thrust member. In the screw compressor of the above construction, since the screw rotors are rotated at high speed, plain bearings are used as the radial bearings and the thrust bearings. Since the slide portions of the bearings are required to be low in friction, a low friction material is used particularly as the material of slide portions of the thrust bearings which receive a thrust force from the thrust members of a high peripheral velocity.

As a thrust bearing using a low friction material as the material of its slide portion, one constituted for example by a plural-layer slide member to be described is known. In this plural-layer slide member, a porous intermediate layer is formed between a metallic backing strip difficult to bond and a resin layer as a slide member to let an anchoring effect be exhibited, thereby making the metal layer and the resin layer difficult to peel from each other and improving the abrasion resistance and sliding characteristic of the resin layer. More particularly, as a slide layer there is used a layer formed by adding 10 to 95 wt % of a molten fluorine resin of tetrafluoroethylene-perfluoroalkylvinyl ether polymer (PFE) or polytetrafluoroethylene-hexafluoropropylene polymer (FAP) to polytetrafluoroethylene (PTFE). To this slide layer are added a material for improving the abrasion resistance and a material for improving the sliding characteristic (see, for example, Japanese Patent Laid Open No. 2002 -194380 ).

The temperature of a bearing is based on heat produced in the thrust member or a shaft and the sliding portion of the bearing. Usually, an oil film is present between the thrust member or the shaft and the slide portion of the bearing and functions to remove heat, so that the temperature of the bearing does not rise beyond a certain level. However, if the oil film breaks or the thrust member or the shaft and the bearing come into direct contact with each other, the temperature of the bearing itself rises rapidly into an abnormally high temperature, resulting in damage of machine having such bearings, thus leading to a serious accident such as a stop of operation. To avoid this inconvenience, there is known a conventional example in which a temperature sensor is embedded in a bearing itself and, when the temperature detected by the temperature sensor exceeds a certain level, it is judged that the bearing is in an abnormal condition. "Thrust bearing trouble detecting device and method" related to this second conventional example will be described below with reference to FIG. 12 which is a construction diagram of the thrust bearing trouble detecting device.

A rotary disc 52 is disposed on a lower surface of a thrust collar of a rotary shaft 51, and plural fan-shaped bearing segments 54 disposed radially around the rotary shaft 51 are supported by a segment support base 55. The rotary disc 52 and the bearing segments 54 are accommodated within an oil reservoir 61 filled with lubricating oil. An oil film 53 is formed between the rotary disc 52 and the bearing segments 54, and the rotary disc 52 is supported slidably by the bearing segments 54 through the oil film 53. The surfaces of the plural bearing segments 54 which are in sliding contact with the rotary disc 52 are formed using a lining material of a synthetic resin. Temperature sensors 62 for detecting the temperatures of the bearing segments 54 are attached to all of the plural bearing segments 54. Temperatures Ta to Tz of the bearing segments 54 measured by the temperature sensors 62 are inputted to a bearing temperature monitor 64 through a temperature transducer 63, in which when any of the temperatures Ta to Tz exceeds a predetermined value, it is judged that the bearing is in an abnormal condition (see, for example, Japanese Patent Laid Open No.2002-168242).

The "thrust bearing trouble detecting device and method" relating to the second conventional example described in Japanese Patent Laid Open No. 2002-168242 is considered to be extremely useful because a trouble of the thrust bearing can be detected by temperature measurement. However, when such a construction is applied to the bearing related to the first conventional example wherein the slide portion is formed by a resin layer, even if there occurs a rise in temperature due to breaking of the oil film or due to direct contact of the thrust member or shaft with the bearing. However, there sometimes is a case where the temperature is not transmitted to the temperature sensor and a trouble of the bearing cannot be detected, because the resin is much lower in thermal conductivity than the metal.

There also is known an oil cooled screw compressor having a pair of intermeshing female and male screw rotors housed within a casing and supported by radial bearings and thrust bearings to which oil after separation and recovery from discharge gas is supplied as lubricating oil. This oil cooled screw compressor (a conventional example) will be outlined below with reference to FIG. 17 which is a schematic explanatory diagram showing the whole of the compressor.

The reference mark C1 in FIG. 17 denotes an oil cooled screw compressor according to the conventional example. In the oil cooled screw compressor C1, an oil separating/recovering unit 83 is disposed in a discharge flow path 82 formed in a screw compressor body 81. A lower portion of the oil separating/recovering unit 83 is formed as an oil sump 84. From the bottom of the oil sump 84 there extends an oil supply flow path 86 which passes through an oil cooler 85 and reaches a rotor chamber and bearings/shafts sealing portions (neither shown). On the other hand, the portion of the discharge flow path 82 located on a secondary side of the oil separating/recovering unit 83 extends from an upper portion of the oil separating/recovering unit 83.

In the oil cooled screw compressor C1, compressed gas is supplied to the rotor chamber and the bearings/shafts sealing portions and, together with lubricating oil which has been conducted to a discharge port, is discharged toward the oil separating/recovering unit 83, in which gas/liquid separation is performed. The thus-separated lubricating oil is once stored in the oil sump 84, while the compressed gas which has become clean after the separation of the lubricating oil is discharged to the portion of the discharge flow path 82 which extends from the upper portion of the oil separating/recovering unit 83.

A layer L of lubricating oil separated and recovered from the compressed gas is formed at all times in a lower portion within the oil sump 84. A lubricating oil viscosity affecting component which forms a layer U on an upper surface of the lubricating oil layer L without being dissolved in the lubricating oil is discharged from the oil separating/recovering unit 83 under a discharge pressure to a drainage flow path 88 by opening an on-off valve 87 at appropriate time intervals. The lubricating oil which forms the lower layer L is supplied to the rotor chamber and the bearings/shafts sealing portions through the oil supply flow path 86 and is thereafter conducted again to the oil separating/recovering unit 83 through the foregoing discharge port (see, for example, Japanese Patent Laid Open No. 2000-186688).

In conventional oil cooled screw compressors, white metals or aluminum alloys are widely used as the materials of bearings which support screw rotors (see, for example, R&D KOBE STEEL TECHNICAL REPORT, Vol. 49, No. 1, APRIL 1999 page 33).

Although a detailed description is not found in the above laid open patent 2000-186688 and R&D KOBE STEEL TECHNICAL REPORT, for example as shown in FIG. 18 which is an explanatory diagram showing in what state a rotor shaft is fitted in a radial bearing, an oil groove 72*b* is formed in a surface of a radial bearing 72 opposed to a rotor shaft 71, i.e., in an inner periphery surface of the radial bearing 72. Further, an oil supply hole 72*a* is formed in the radial bearing 72, the oil supply hole 72*a* communicating with the oil groove 72*b* from an outer periphery of the radial bearing 72 to supply oil (lubricating oil) to between the inner periphery surface of the radial bearing 72 and the outer periphery surface of the rotor shaft 71. In the case of an oil cooled screw compressor, the pressure of oil supplied to the radial bearing 72 is almost equal to the discharge pressure. In many cases, gas is dissolved in the oil. The pressure of oil discharged from the radial bearing 72 is almost equal to the suction pressure in the oil cooled screw compressor. However, the pressure of oil present in the oil groove 72*b* of the radial bearing 72 is an intermediate pressure between the discharge pressure and the suction pressure in the oil cooled screw compressor.

That is, in the oil groove 72, the pressure of oil is reduced from the pressure equal to the discharge pressure in the oil cooled screw compressor to the intermediate pressure between the discharge pressure and the suction pressure, so that the gas dissolved in the oil separates at the time of the pressure reduction and there occurs what is called foaming. The oil which is in such a foaming state is rolled up onto the rotor shaft 71 and is supplied in a large quantity to a pressure receiving surface 72*c* on which a load W is imposed, resulting in that an oil film present on the pressure receiving surface 72*c* of the radial bearing 72 breaks. Consequently, the rotor shaft 71 and the radial bearing 72 come into direct contact with each other and there arises a fear of occurrence of a mechanical trouble such as galling or scratching of the shaft and the bearing. Although reference has been made above to the radial bearing as an example, the above description is also applicable to a thrust member and a thrust bearing which bear a thrust force of each rotor shaft in an oil cooled screw compressor.

The foregoing Japanese Patent Laid Open No. 2000-186688 discloses, for the protection of bearings, etc. in an oil cooled screw compressor, an effective means which uses a simple construction for separating a lubricating oil viscosity affecting component in an oil separating/recovering unit and which thereby conducts only lubricating oil having a viscosity of an allowable value or higher to the bearings, etc. However, it does not disclose any means for eliminating the trouble caused by the foregoing foaming of oil.

SUMMARY OF THE INVENTION

It is a first object of the present invention to provide a bearing being constituted by a plural-layer slide member having a resin layer in a slide portion between it and a thrust member or a shaft, but nevertheless capable of detecting its temperature accurately, as well as a screw compressor having the bearing.

It is a second object of the present invention to provide an oil cooled screw compressor which, even in the event of occurrence of foaming in oil for lubricating radial bearings and thrust bearings, can prevent the occurrence of mechanical troubles such as galling and scratching.

The present invention has been accomplished in view of the above-mentioned circumstances, and a means which a first invention in the present case has adopted for achieving the above first object is a bearing comprises: a backing strip; a slide member constituted by a resin layer and bonded to the backing strip, the bearing receiving a force through the resin layer; a temperature measuring metallic member, the temperature measuring metallic member being fitted in a fitting hole which is formed from the resin layer side and has a depth exceeding the thickness of the resin layer; and a temperature sensor for detecting a temperature corresponding to the temperature of the temperature measuring metallic member, the temperature sensor being fitted in a hole formed in the backing strip.

In the bearing of the first invention, a temperature sensing portion of the temperature sensor for detecting the temperature of the temperature measuring metallic member may be brought into contact with the temperature measuring metallic member. More specifically, the bearing of this first invention may have a construction wherein the temperature of the temperature measuring metallic member fitted from the resin layer side of the bearing constituted by a plural-layer slide member into the fitting hole having a depth exceeding the thickness of the resin layer is detected directly by the temperature sensing portion of the temperature sensor. According to this construction, since the temperature measuring metallic member far superior in thermal conductivity to the resin layer, it is possible to detect the temperature of the bearing accurately.

In the bearing of the first invention, the temperature sensing portion of the temperature sensor for detecting the temperature of the temperature measuring metallic member may be positioned near the temperature measuring metallic member. More specifically, the bearing of this first invention may have a construction wherein the temperature of the backing strip transmitted thereto from the temperature measuring metallic member is detected, the temperature measuring metallic member being fitted from the resin layer side of the bearing constituted by a plural-layer slide member into the fitting hole having a depth exceeding the thickness of the resin layer, that is, the temperature of the temperature measuring metallic member is detected indirectly by the temperature sensing portion of the temperature sensor. According to this construction, although the detection accuracy is inferior to the preceding case where the temperature of the temperature measuring metallic member is detected directly, the temperature of the bearing can be detected accurately because the temperature measuring metallic member and the backing strip are far superior in thermal conductivity than the resin layer.

In the bearing of the first invention it is preferable that an end face of the temperature measuring metallic member be made flush with a slide surface of the resin layer. According to this construction, the temperature of the bearing can be detected more accurately because it is transmitted directly to the temperature measuring metallic member.

In the bearing of the first invention it is preferable that the temperature measuring metallic member be formed of a metal lower in melting point than the resin layer. According to this construction, the temperature measuring metallic member melts earlier than the resin layer during the time of an abnormal rise of temperature, so there is no fear that the surface opposed to the resin layer, i.e., the thrust member or the shaft, is scratched.

A means which a second invention in the present case has adopted for achieving the foregoing first object of the present invention is a bearing comprising: a resin bearing, the resin bearing comprising a backing strip and a slide member as a resin layer bonded to the backing strip; a metallic bearing, the metallic bearing comprising a backing strip and a sliding metallic member bonded to the backing strip; a temperature sensor for measuring a temperature corresponding to the temperature of the sliding metallic member of the metallic bearing, the temperature sensor being fitted in a hole formed in the backing strip of the metallic bearing; and a bearing holding member, with a plurality of bearing fitting recesses being formed at equal intervals on a circle having a radius centered at the center of the bearing holding member, the resin bearing and the metallic bearing being fitted mixedly into the bearing fitting recesses.

According to the second invention, the temperature of the resin bearing can be estimated easily by detecting the temperature of the metallic bearing which is higher in temperature conductivity than the resin bearing, with the temperature sensor so that it is possible to prevent damage of the bearings. Besides, the sliding metallic member of the metallic bearing, e.g., white metal, is lower in melting point than the resin layer of the resin bearing, for example, formed by polytetrafluoroethylene ("PTFE" hereinafter) so that the strength of the metallic bearing becomes low with a rise in temperature, but there is no fear of damage to the entire bearing because the resin bearing undertakes the thrust force.

Next, means which a third invention in the present case has adopted for achieving the foregoing second object is a screw compressor comprising: a casing; a pair of female and male screw rotors meshed with each other and housed within the casing; radial bearings mounted in sliding contact with rotor shafts of the pair of female and male screw rotors to undergo radial forces transmitted thereto from the rotor shafts; thrust bearings disposed on both sides of a disc-like thrust member, being fitted on one of the rotor shafts of each of the pair of screw rotors, to undergo thrust forces transmitted from the associated screw rotor to the thrust member; and an oil supply means for supplying oil after separation and recovery from discharge gas compressed by the screw rotors to the radial bearings and the thrust bearings as lubricating oil, wherein at least one of surfaces of the radial bearings opposed to the rotor shafts and surfaces of the thrust bearings opposed to the thrust member is covered with a resin material.

In the screw compressor of the third invention it is preferable that the resin material be polyether ether ketone.

In the screw compressor of the third invention, oil after separation and recovery from discharge gas is supplied as lubricating oil to the radial bearings and/or the thrust bearings by the oil supply means. Even if foaming occurs in the oil due to pressure reduction and an oil film breaks on a pressure receiving surface of any of the radial bearings, there is no fear of direct contact between the metal of the radial bearing and the associated rotor shaft because the bearing surface is covered with the resin material, nor is there any fear of direct contact between the thrust member fitted on each rotor shaft and the metal of the thrust bearings. Thus, there is no fear of occurrence of a mechanical trouble caused by foaming such as galling or scratching in the rotor shafts, thrust members, radial bearings and thrust bearings.

In the screw compressor of the third invention, the oil supply means may comprise an oil supply pipe for supplying oil to the thrust bearings and an oil return pipe for returning oil from the thrust bearings to a gas compressing chamber formed by the pair of screw rotors and the casing, with an orifice which may be formed in at least one of the oil supply pipe and the oil return pipe.

DETAILED DESCRRIPTION OF THE PREFERRED EMBODIMENTS

Figure 1:
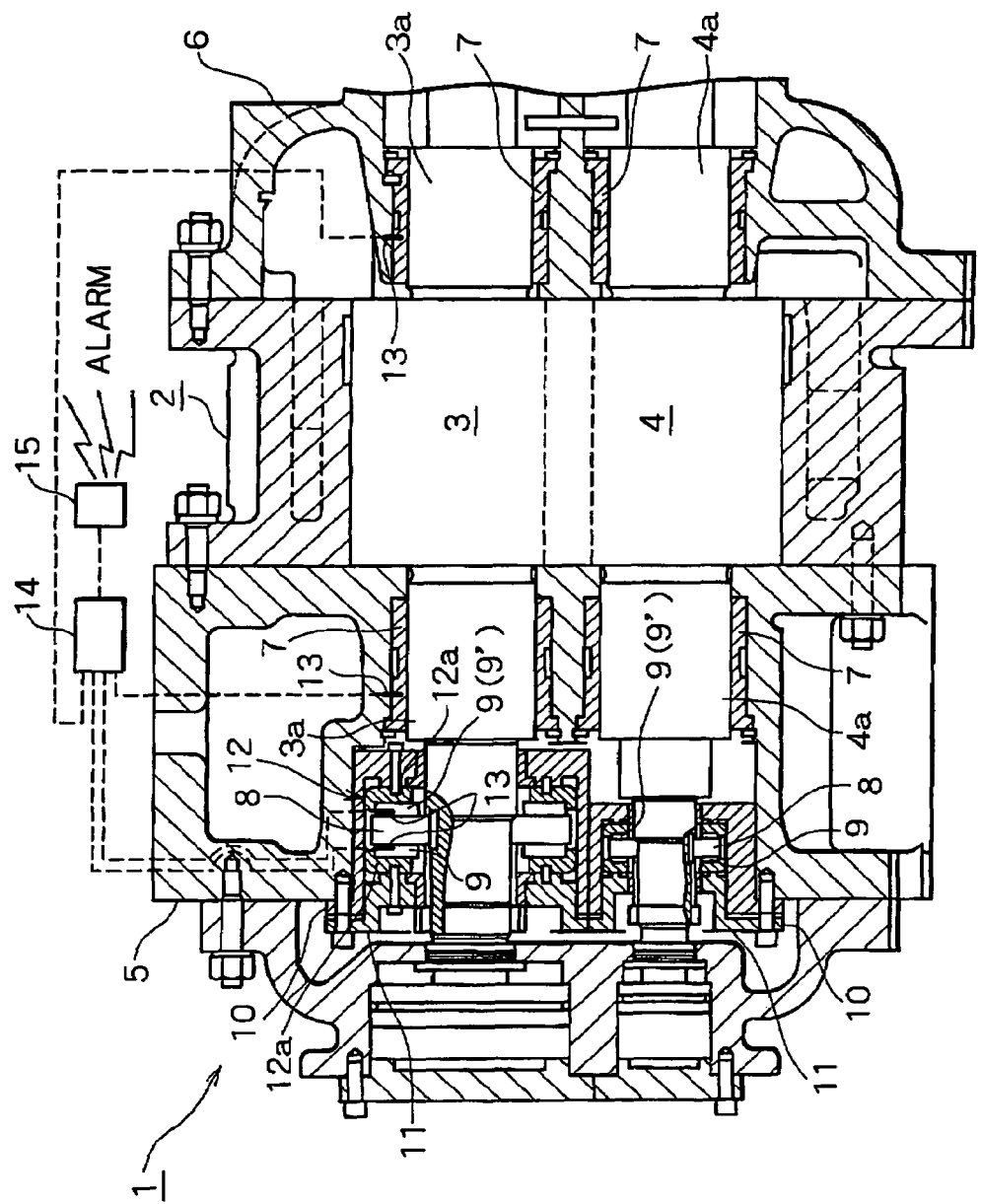
FIG. 1 is a sectional view of a principal portion of a screw compressor according to the present invention, showing in what state bearings are arranged.
Figure 2:
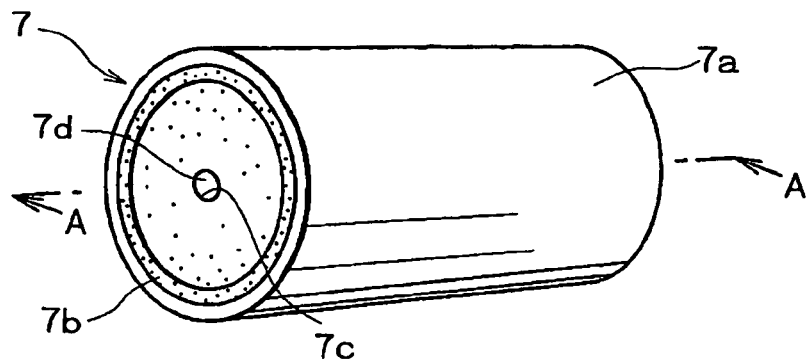
FIG. 2 is a perspective view of a radial bearing used in a first embodiment of the present invention.
Figure 3:
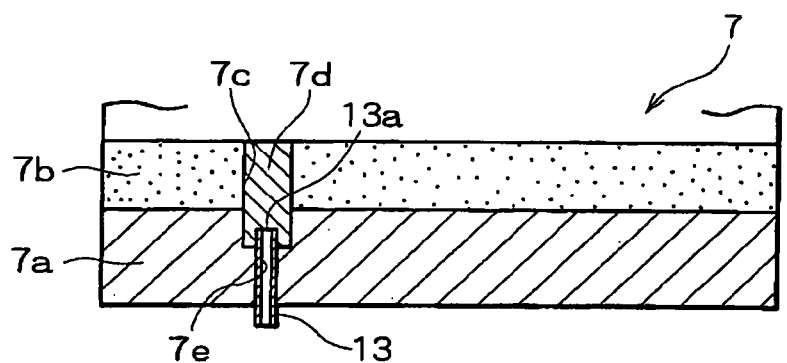
FIG. 3 is a sectional view of FIG. 2.
Figure 4:
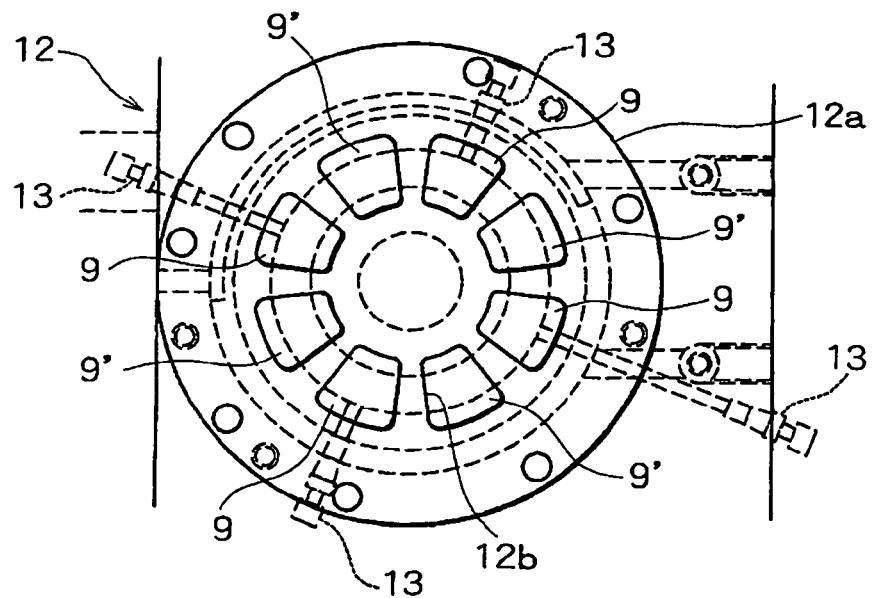
FIG. 4 illustrates a tilting pad thrust bearing used in the first embodiment as seen from the thrust bearing side.
Figure 5:
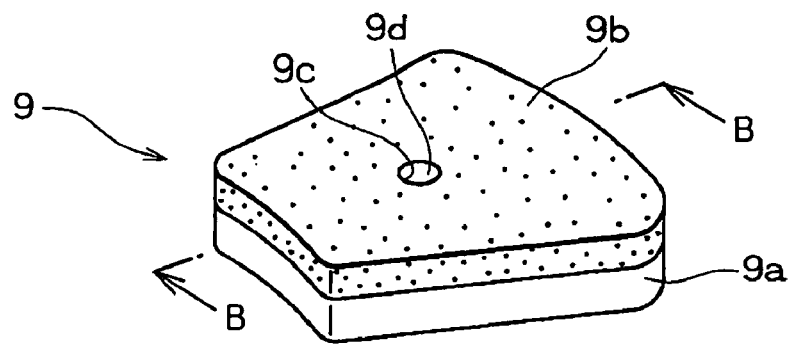
FIG. 5 is a perspective view of a thrust bearing used in the first embodiment.
Figure 6:
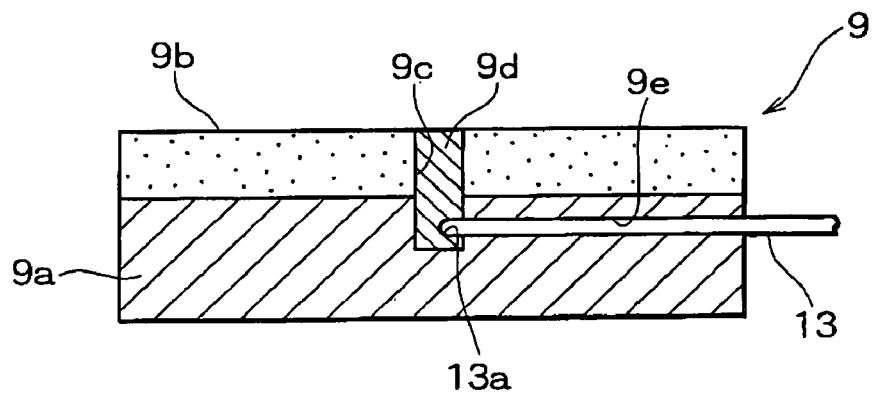
FIG. 6 is a sectional view of FIG. 5.

A screw compressor and bearings according to a first embodiment of the present invention will be described below with reference to the accompanying drawings. FIG. 1 is a sectional view of a principal portion of the screw compressor, showing in what state bearings are arranged in the screw compressor. FIG. 2 is a perspective view of a radial bearing, FIG. 3 is a sectional view taken on line A-A in FIG. 2. FIG. 4 illustrates a tilting pad thrust bearing as seen from a thrust bearing side, FIG. 5 is a perspective view of a thrust bearing, and FIG. 6 is a sectional view taken on line B-B in FIG. 5.

In the figures, the reference numeral 1 denotes a screw compressor having bearings according to the present invention. The screw compressor 1 is provided with a casing 2. A pair of intermeshing female and male screw rotors 3, 4 are housed within the casing 2. Of the pair of female and male screw rotors 3, 4, the screw rotor 3 is rotated by a motor (not shown), while the other screw rotor 4 is rotated with rotation of one screw rotor 3. Rotor shafts 3a and 4a positioned on both sides of screws of the pair of female and male screw rotors 3, 4 are supported by radial bearings 7 of a construction to be described later, the radial bearings 7 being fitted in bearing boxes formed in bearing cases 5 and 6 which are clamped with bolts to open ends of the casing 2. Disc-like thrust members 8 are keyed to the left-hand rotor shafts 3a and 4a in FIG. 1 at positions outside the radial bearings 7.

The radial bearings 7 are each constituted as shown in FIGS. 2 and 3. The radial bearings 7 each comprise an outer periphery-side backing strip 7a formed of steel and an inner periphery-side resin layer 7b formed of PEEK and bonded to the backing strip 7a. Thus, each radial bearing 7 is constituted by forming a plural-layer slide member into a cylindrical shape. Between the backing strip 7a and the resin layer 7b of the radial bearing 7 there is formed an intermediate layer (a thin layer) (not shown) for bonding the backing strip 7a and the resin layer 7b to each other. A fitting hole having a depth exceeding the thickness of the resin layer 7b is formed in the radial bearing 7 from the resin layer 7b side. The fitting hole, indicated at 7c, extends through the resin layer 7b and further through the intermediate layer. Fitted in the fitting hole 7c is a temperature measuring metallic member 7d formed by a white metal lower in melting point than the resin layer 7b, one end face of the temperature measuring metallic member 7d constituting a part of an inner periphery surface of the resin layer 7b. Further, a temperature measuring hole 7e is formed in the backing strip 7a by cutting through a part of the temperature measuring metallic member 7d from an outside of the backing strip 7a, and a temperature sensor 13 is inserted into the temperature measuring hole 7e. A temperature sensing portion 13a formed at the tip of the temperature sensor 13 is in contact with the temperature measuring metallic member 7d and is constructed so that it can detect the temperature of the temperature measuring metallic member 7d directly. It is preferable that the thickness of the resin layer 7b be set at 2 to 5 mm and that the diameter of the temperature measuring metallic member 7d be set at 1 to 2.5 times longer than the thickness of the resin layer 7b. As the temperature sensor 13 it is preferable to use, for example, a sheath type thermocouple element fabricated by covering a strand of a thermocouple element with sheath (cover) and press-fitting inside the sheath by an inorganic insulator or the like to enhance insulating and corrosion-resisting properties.

On both sides of each thrust member 8 there are disposed thrust bearings 9, 9' with a construction to be described later which are in sliding contact with surfaces of the thrust member 8. The thrust bearings 9, 9' which are in sliding contact with the surface on the radial bearing 7 side of the thrust member 8 are secured to a tilting pad thrust bearing 12 fixed to a first bearing retainer 10 which is bolted to an end face of the bearing case 5. On the other hand, the thrust bearings 9 which are in sliding contact with the surface opposite to the radial bearing 7 side of the thrust member 8 are secured to the tilting pad thrust bearing 12 fixed to a second bearing retainer 11 having a flange portion which is bolted to an end face of the bearing case 5 in a superimposed state on a flange portion of the first bearing retainer 10. As shown in FIG. 4, the tilting pad thrust bearing 12 has a disc-like bearing holding member 12a. Eight fan-shaped bearing fitting recesses 12b are formed at equidistant positions on a circle centered at the center of the bearing holding member 12a, and the thrust bearings 9, 9' are respectively fitted tiltably and alternately in the bearing fitting recesses 12b. Insertion holes are formed in the four thrust bearings 9 respectively and temperature sensors 13 for detecting the temperature of the thrust bearings 9 are inserted into the insertion holes respectively.

As shown in FIGS. 5 and 6, each of the thrust bearings 9 is made up of a backing strip 9a formed of steel and a resin layer 9b formed of PTFE and bonded to the backing strip 9a. Each thrust bearing 9 is fabricated by forming a plural-layer slide member comprising the backing strip and the resin layer into a fan-shape. Between the backing strip 9a and the resin layer 9b of the thrust bearing 9 is formed an intermediate layer (not shown) for bonding the backing strip 9a and the resin layer 9b. In the thrust bearing 9, a fitting hole 9c having a depth exceeding the thickness of the resin layer 9b is formed from the resin layer 9b side. A temperature measuring metallic member 9d formed of a white metal having a melting point lower than the melting point of the resin layer 9b is fitted in the fitting hole 9c, one end face of the temperature measuring metallic member 9d constituting a part of the plane of the resin layer 9b. A temperature measuring hole 9e is formed into the backing strip 9a from an end face side of the backing strip 9a and further into a part of the temperature measuring metallic member 9d, and a temperature sensor 13 is inserted into the temperature measuring hole 9e. A temperature sensing portion 13a formed at the tip of the temperature sensor 13 is in contact with the temperature measuring metallic member 9d so that it can detect the temperature of the temperature detecting metallic member 9d directly. It is preferable that the thickness of the resin layer 9b be set at 2 to 5 mm and that the diameter of the temperature measuring metallic member 9d be set at 1 to 2.5 times longer than the thickness of the resin layer 7b. As the temperature sensor 13, the use of for example a sheath type thermocouple element is preferred as is the case with the foregoing radial bearing.

Each of the thrust bearings 9' is fabricated by forming a plural-layer slide member comprising a backing strip of steel and a resin layer of PTFE into the fan-shape. When a fitting hole, a temperature measuring metallic member, a temperature measuring hole and a temperature sensor are provided in the thrust bearing 9', the construction of the thrust bearing 9' becomes the same as that of the thrust bearing 9 described above.

Although in this first embodiment the resin layer 7b in each radial bearing 7 and the resin layer 9b in each thrust bearing 9 are constituted by PTFE, they may be constituted by, for example, polytetrafluoroethylene-perfluoroalkylvinyl ether polymer (PFE) or polytetrafluoroethylene-hexafluoropropylene polymer (FAP) as in the foregoing first conventional example. Thus, no limtation is made to the use of PTFE.

Detected temperature values of the radial bearings 7 and thrust bearings 9 on the rotor shafts 3a and 4a detected by the temperature sensors 13 are transmitted to a bearing temperature monitor 14, in which the detected temperature values are each compared with a preset threshold temperature (although in FIG. 1 it is depicted that the temperatures of the radial bearings 7 and the thrust bearings 9 on only the rotor shaft 3a are detected, an actual construction permits detection of the temperatures of the radial bearings 7 and the thrust bearings 9 also on the rotor shaft 4a). If any of the detected temperatures of the radial bearings 7 and the thrust bearings 9 exceeds the threshold temperature, an alarm is given from an alarm unit 15. The threshold temperature is set at a temperature lower by a predetermined temperature than the melting point of PTFE which constitutes the resin layers 7b and 9b, for example at 100° C. The reason why a white metal is used as the material of the temperature measuring metallic members 7d and 9d is that, as described above, the melting point of the white metal is lower than that of the resin layers 7b and 9b formed of PTFE, that is, the white metal melts earlier than the resin layers 7b and 9b when the temperature rises to an abnormal extent, and thus there is no fear of damage to the outer periphery surfaces of the rotor shafts 3a, 4a and to the slide surfaces of the thrust members 8.

The operation of the screw compressor 1 of this first embodiment will now be described. When the operation of the screw compressor 1 is started, the temperatures of the radial bearings 7 and thrust bearings 9 rise gradually with the lapse of operation time. In the following operation, the temperatures of the radial bearings 7 and thrust bearings 9 are held at a certain constant level as long as oil films do not break. The temperatures of the radial bearings 7 and thrust bearings 9 are transmitted to the temperature measuring metallic members 7d and 9d formed of white metal. Then, the temperatures of the temperature measuring metallic members 7d and 9d are detected as the temperatures of the radial bearings 7 and thrust bearings 9 by the temperature sensing portions 13a of the temperature sensors 13, and the thus-detected temperature values are transmitted to the bearing temperature monitor 14 constantly. While the screw compressor 1 is in operation with measuring bearing temperatures, if oil films break for some reason and the resin layers 7a of the radial bearings 7 come into direct contact with the rotor shafts 3a and 4a or the resin layers 9a of the thrust bearings 9 come into direct contact with the thrust members 8, the temperatures of the radial bearings 7 or thrust bearings 9 rise abruptly.

The detected temperatures of the radial bearings 7 or thrust bearings 9 are compared with preset threshold temperatures by the bearing temperature monitor 14. When any of those detected temperatures exceeds the threshold temperature, the bearing temperature monitor 14 judges that the temperature of the associated radial bearing 7 or thrust bearing 9 has reached an abnormally high level and provides a command signal for an alarm to the alarm unit 15. Thus, an abnormal temperature of the radial bearings 7 or thrust bearings 9 in the screw compressor 1 during operation can be detected securely, whereby the occurrence of a serious accident of the screw compressor 1 caused by an abnormal temperature of the radial bearings 7 or thrust bearings 9 can be prevented. During a rapid increase in temperature of the radial bearings 7 or thrust bearings 9, the temperature measuring metallic member 7d or 9d melts earlier than the resin layer 7b or 9b and so there is no fear of damage to the rotor shafts 3a, 4a or the thrust members 8.

In the above first embodiment, reference has been made to an example in which the temperatures of the radial bearings 7 and thrust bearings 9 on the rotor shafts 3a and 4a of both screw rotors 3 and 4 are detected. However, as shown in FIG. 1, only the temperatures of the radial bearings 7 and thrust bearings 9 on the rotor shafts 3a of the screw rotor 3 may be measured. Of course, only the temperatures of the radial bearings 7 and thrust bearings 9 on the rotor shaft 4a of the screw rotor 4 may be measured.

Figure 7:
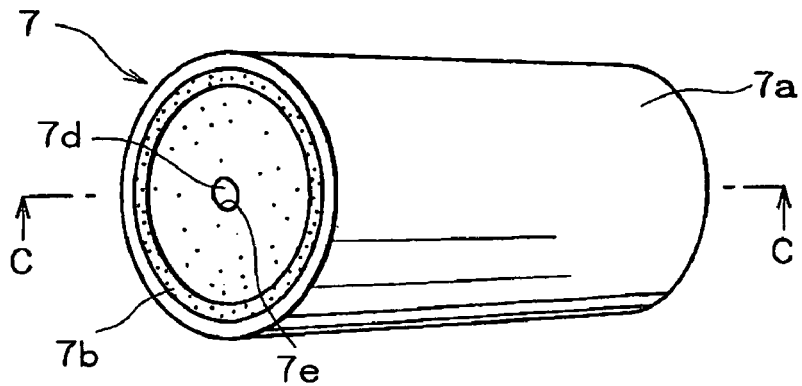
FIG. 7 is a perspective view of a radial bearing used in a second embodiment of the present invention.
Figure 8:
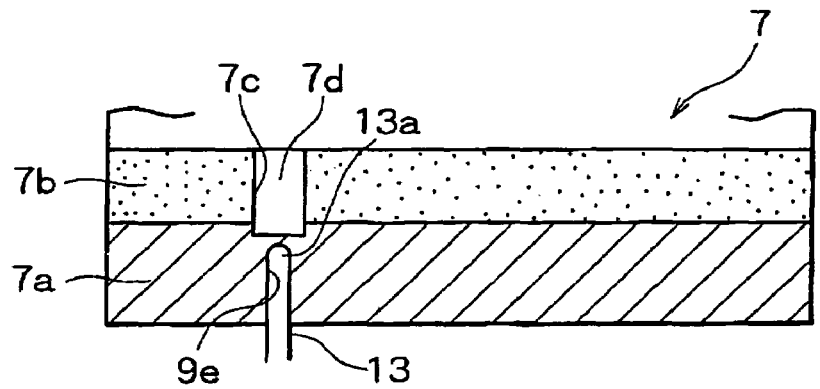
FIG. 8 is a sectional view of FIG. 7.
Figure 9:
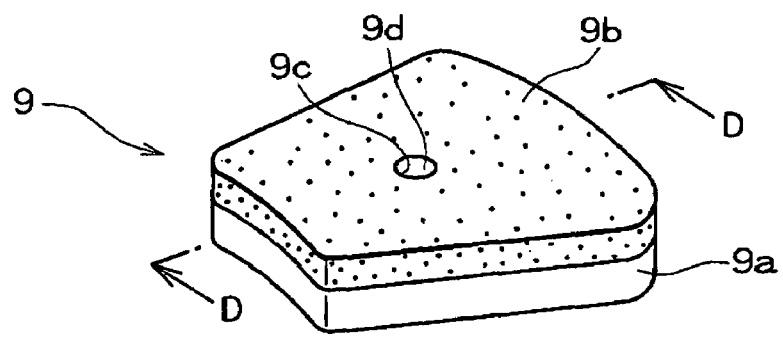
FIG. 9 is a perspective view of a thrust bearing used in the second embodiment.
Figure 10:
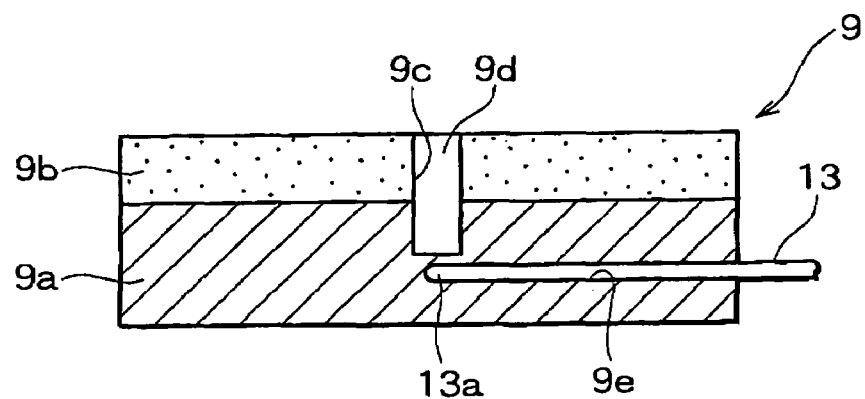
FIG. 10 is a sectional view of FIG. 9.

Bearings in a screw compressor according to a second embodiment of the present invention will be described below with reference to the accompanying drawings. FIG. 7 is a perspective view of a radial bearing, FIG. 8 is a sectional view taken on line C-C in FIG. 7, FIG. 9 is a perspective view of a thrust bearing, and FIG. 10 is a sectional view taken on line D-D in FIG. 9. The construction of the screw compressor and that of the bearings in this second embodiment are the same as in the previous first embodiment and a difference is recognized in only the position of a temperature sensing portion of each temperature sensor. Therefore, the following description will refer to only the different point.

Radial bearings 7 used in the screw compressor of this second embodiment are each constituted as shown in FIGS. 7 and 8. In each of the radial bearings 7, a fitting hole 7c having a depth which exceeds the thickness of a resin layer 7b is formed from the resin layer 7b side. A temperature measuring metallic member 7d formed of a white metal having a melting point lower than the melting point of the resin layer 7b is fitted in the fitting hole 7c so that one end face thereof constitutes a part of an inner periphery surface of the resin layer 7b. Further, a temperature measuring hole 7e having a depth which reaches a position near the temperature measuring metallic member 7d is formed in the backing strip 7a from an outer side of the backing strip. A sheath type temperature sensor 13 is inserted into the temperature measuring hole 7e. A temperature sensing portion 13a formed at the tip of the temperature sensor 13 is in contact with the bottom of the temperature measuring hole 7e to detect the temperature of the temperature measuring metallic member 7d indirectly through the backing strip 7a.

In a thrust bearing 9, as shown in FIGS. 9 and 10, a fitting hole 9c having a depth which exceeds the thickness of a resin layer 9b is formed from the resin layer 9b side. A temperature measuring metallic member 9d formed of a white metal having a melting point lower than the melting point of the resin layer 9b is fitted in the fitting hole 9c so that one end face thereof constitutes a part of the plane of the resin layer 9b. Further, a temperature measuring hole 9e having a depth which reaches a position near an end portion of the temperature measuring metallic member 9d is formed in the backing strip 9a from an end face side of the backing strip and a temperature sensor 13 is inserted into the temperature measuring hole 9e. A temperature sensing portion 13a formed at the tip of the temperature sensor 13 is in contact with the bottom of the temperature measuring hole 9e to detect the temperature of the temperature measuring metallic member 9d indirectly through the backing strip 9a.

In this second embodiment, as described above, since the temperature of the temperature measuring metallic member 7d or 9d is measured indirectly through the backing strip 7a or 9a, the measuring sensitivity and accuracy are inferior to those in the first embodiment. However, a practical application is ensured because the backing strip 7a or 9a is formed of steel and is thus far superior in thermal conductivity to the resin layer.

Figure 11:
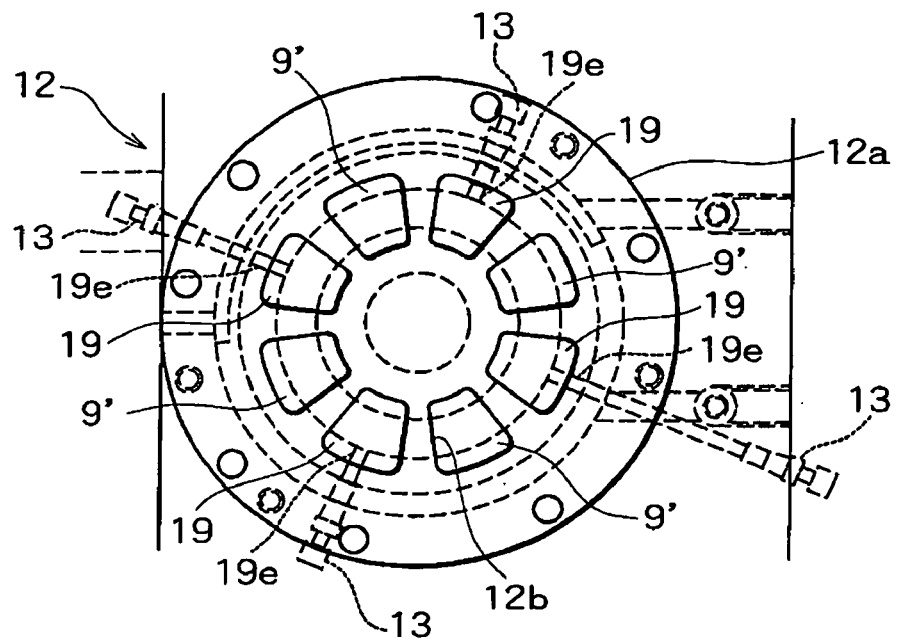
FIG. 11 illustrates a tilting pad thrust bearing used in a third embodiment of the present invention as seen from the thrust bearing side.
Figure 12:
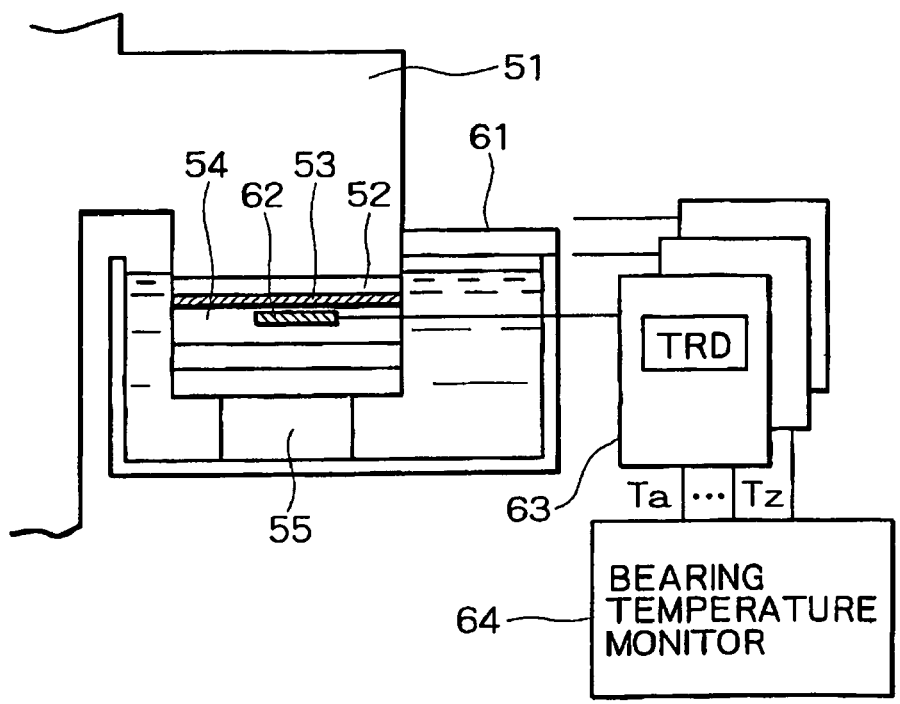
FIG. 12 is a construction diagram of a conventional thrust bearing trouble detecting device.

A tilting pad thrust bearing used in the screw compressor according to a third embodiment of the present invention will be described below with reference to the accompanying drawings. FIG. 11 illustrates the tilting pad thrust bearing as seen from a thrust bearing side. The construction of the tilting pad thrust bearing itself is the same as in the first embodiment, with a difference being recognized in only the construction of a thrust bearing. Therefore, the following description is provided only about the different point.

Eight fan-shaped bearing fitting recesses 12b are formed in equidistant positions on a circle centered at the center of a bearing holding member 12a. Thrust bearings (resin bearings) 9' which have been used in the tilting pad thrust bearing in the first embodiment and thrust bearings 19 of a construction to be described are fitted in the bearing fitting recesses 12b alternately and tiltably. Each of the thrust bearings 19 is a metallic bearing wherein a slide member (sliding metallic member) is formed of a white metal layer and this white metal layer is bonded to a backing strip formed of steel. A temperature measuring hole 19e is formed in the backing strip of the thrust bearing 19 and a temperature sensor 13 is inserted into the temperature measuring hole 19e. Of course, a temperature sensing portion 13a of the temperature sensor 13 is in contact with the bottom of the temperature measuring hole 19e.

A description will now be given of the operation of the tilting pad thrust bearing 12 in accordance with this third embodiment. According to the tilting pad thrust bearing 12, the temperature of the thrust bearing 9' can be estimated easily by detecting the temperature of the metallic bearing high in temperature conductivity through the temperature sensor 13, so that it is possible to prevent damage of the tilting pad thrust bearing. Since the white metal layer in the thrust bearing 19 is lower in melting point than the resin layer of PEEK in the thrust bearing 9', so that the strength of the thrust bearing 19 and hence the thrust force bearing effect of the thrust bearing 19 are deteriorated as the temperature rises. However, since the thrust force is borne by the thrust bearing 9', there is no fear of damage of the tilting pad thrust bearing 12.

Preferred thickness of the resin layer and diameter of the temperature measuring metallic member in the second and third embodiment are the same as in the first embodiment. Also in the second and third embodiments, as in the first embodiment, the use of for example a sheath type thermocouple element is preferred as the temperature sensor 13.

Although in the first to third embodiments an end face of the temperature measuring metallic member is flush with the slide surface of the resin layer, the present invention is not limited to such a mode. For example, the temperature measuring metallic member may be disposed in such a manner that an end portion thereof is buried into the resin layer. More particularly, for avoiding the formation of an unnecessary step portion in the slide surface, the step portion between the slide surface and an end portion of the temperature measuring metallic member is filled up with resin. However, if the resin layer which covers the end portion of the temperature measuring metallic member becomes thick, an error incapable of being ignored will occur in a measured temperature due to low temperature conductivity of the resin layer and therefore it is preferable that the resin layer which covers the end portion of the temperature measuring metallic member be as thin as possible.

Although in the above description reference has been made to an example in which the bearing of the present invention is applied to a screw compressor, the bearing is also applicable to other machines and devices; for example, it is employable as the bearing for a water-wheel generator. Further, as will be described later, the bearing of the present invention is applicable to an oil cooled screw compressor of the type in which oil after separation and recovery from discharge gas is supplied as lubricating oil.

Figure 13:
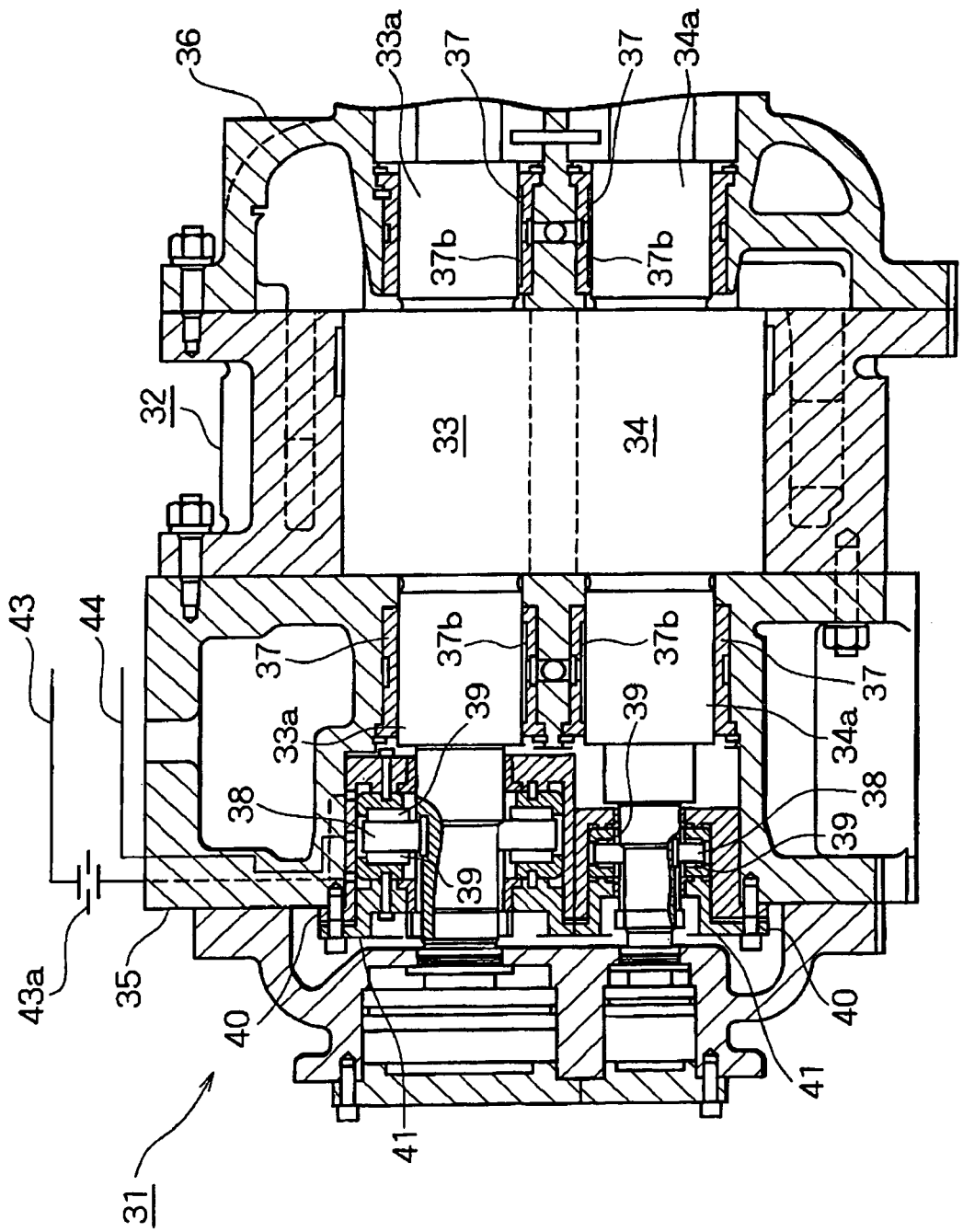
FIG. 13 is a sectional view of a principal portion of an oil cooled screw compressor according to a fourth embodiment of the present invention, showing in what state bearings are arranged.

Next, an oil cooled screw compressor according to a fourth embodiment of the present invention will be described with successive reference to the accompanying drawings. FIG. 13 is a sectional view of a principal portion of the oil cooled screw compressor, showing in what state bearings are arranged, FIG. 14 is an enlarged view of a radial bearing portion, and FIG. 15 is a schematic explanatory diagram showing a construction for lubricating thrust bearings.

In these figures, the reference numeral 31 denotes the oil cooled screw compressor of this fourth embodiment, which is provided with a casing 32. A pair of intermeshing female and male screw rotors 33, 34 are housed within the casing 32. Of the pair of female and male screw rotors 33, 34, the screw rotor 33 is rotated by a motor (not shown), while the other screw rotor 34 is rotated with rotation of the screw rotor 33. Rotor shafts 33a and 34a positioned on both sides of screws of the pair of female and male screw rotors 33, 34 are supported by radial bearings 37 with a construction to be described later, the radial bearings 37 being fitted in bearing boxes formed in bearing cases 35 and 36 which are clamped with bolts to open ends of the casing 32. Disc-like thrust members 38 are keyed to the left-hand rotor shafts 33a and 34a in FIG. 13 at positions outside the radial bearings 37.

On both sides of each thrust member 38 there are disposed thrust bearings 39 which are in sliding contact with surfaces of the thrust member 38. The thrust member 39 which is in sliding contact with the surface on the radial bearing 37 side of the thrust member 38 is supported by being fitted in a recess of a first bearing retainer 40 having a flange portion which is bolted to an end face of the bearing case 35. The thrust bearing 39 which is in sliding contact with the surface opposite to the radial bearing 37 side of the thrust member 38 is supported by being fitted in a recess of a second bearing retainer 41 having a flange portion which is bolted to an end face of the bearing case 35 in a superimposed state on the flange portion of the first bearing retainer 40. The first and second bearing retainers 40 and 41 are each composed of a bearing retainer body which is bolted to an end face of the bearing case 35 and a bearing support member which is bolted to the bearing retainer body and has a fitting recess for fitting therein the associated thrust bearing 39.

Figure 14:
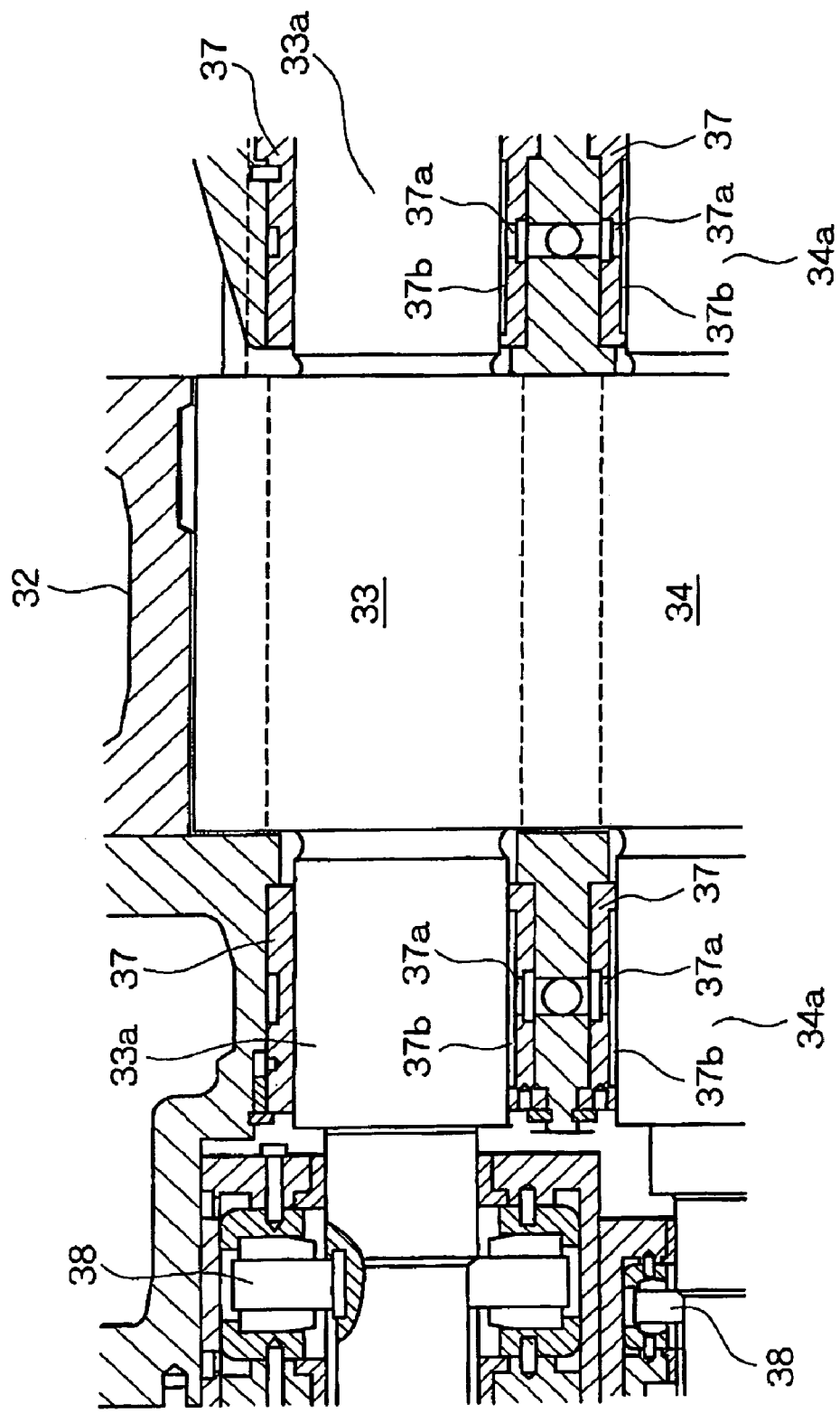
FIG. 14 is an enlarged diagram of a radial shaft portion in the oil cooled screw compressor of the fourth embodiment.
Figure 15:
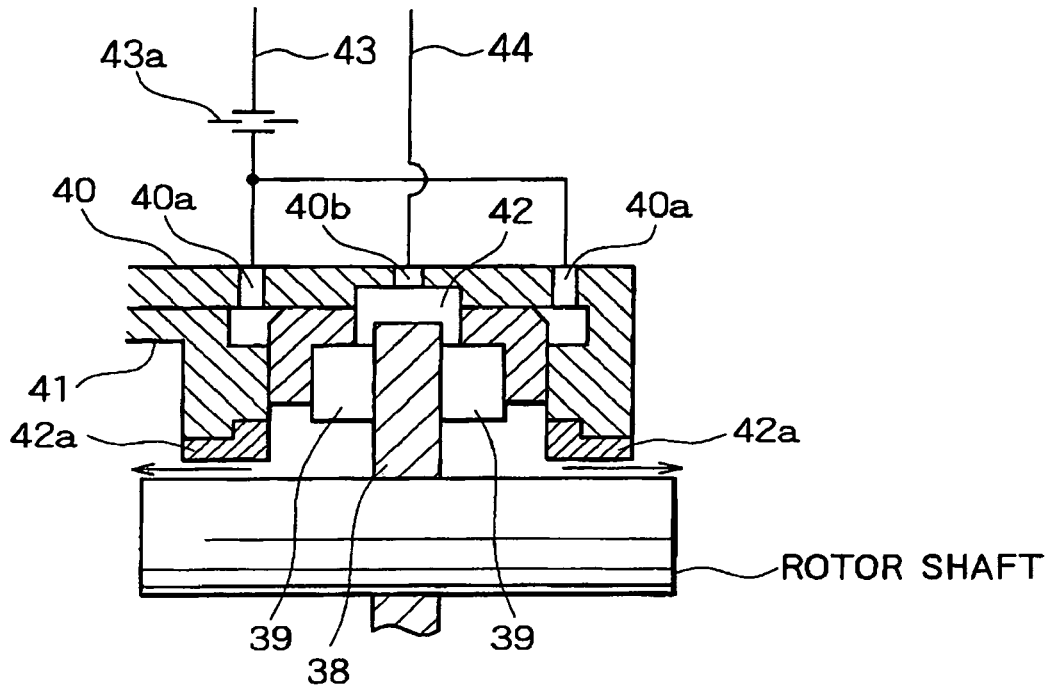
FIG. 15 is a schematic explanatory diagram showing a construction for lubricating thrust bearings in the oil cooled screw compressor of the fourth embodiment.

In an inner periphery surface on the sliding side of the associated rotor shafts 33a, 34a of each radial bearing 37 there is formed an oil groove 37b as shown in FIG. 14. On the other hand, an oil supply hole 37a is formed from an outer periphery side of the radial bearing 37 so as to communicate with the oil groove 37b. Oil separated and recovered from discharge gas by an oil separating/recovering unit (not shown) and having a pressure almost equal to the pressure of the discharge gas is fed to the oil supply hole 37a through an oil supply means (oil supply pipe), (not shown). The inner periphery of the radial bearing 37 is covered with a layer of polyether ether ketone (PEEK), (not shown) which is a resin material superior in both heat resistance and abrasion resistance and low in start-up friction coefficient. The PEEK layer is adhered or bonded to the backing strip through an intermediate layer and having a thickness of about 2 mm. The oil discharged from the radial bearings 37 into the inner spaces of the bearing cases 35 and 36 is sucked from a gas suction port into a gas compressing chamber (a screw accommodating chamber) formed in the oil cooled screw compressor.

As shown in FIGS. 13 and 15, the thrust bearings 39 are lubricated with oil which is fed into an oil influx/efflux space 42, the space 42 being formed inside the first and second bearing retainers 40, 41 and sealed with a seal 42a. More specifically, oil supply holes 40a which communicate with the oil influx/efflux space 42 from the outer periphery of the first bearing retainer 40 are formed in front and rear positions of the first bearing retainer 40, that is, on both sides of the thrust member 38. An oil supply pipe 43 as an oil supply means with an orifice 43a disposed therein branches and the branched pipes are in communication with the oil supply holes 40a respectively. As is the case with the radial bearings 37, oil separated and recovered from discharge gas by an oil separating/recovering unit (not shown) and having a pressure almost equal to the pressure of the discharge gas is fed to the oil supply holes 40a.

Further, an oil return hole 40b is formed at an intermediate position between the two oil supply holes 40a in the outer periphery of the first bearing retainer 40. The oil return hole 40b communicates through an oil return pipe 44 with a gas suction port which leads to the gas compressing chamber (screw accommodating chamber) formed in the oil cooled screw compressor. The oil having been used to lubricate the thrust bearings 39 and present within the oil influx/efflux space 42 is sucked into the gas suction port. The surfaces of the thrust bearings 39 opposed to the thrust member 38 are covered with a layer of PEEK (not shown) which is superior in both heat resistance and abrasion resistance and low in start-up friction coefficient. As is the case with the radial bearings 37, the PEEK layer is adhered or bonded to the backing strip through an intermediate layer and has a thickness of about 2 mm.

The following description is now provided about the operation of the oil cooled screw compressor 31 having the radial bearings 37 constructed as above. Oil after separation and recovery from discharge gas through the oil supply pipe is fed as lubricating oil to the radial bearings 37. Even if there occurs foaming in the oil due to pressure reduction and an oil film breaks on the pressure receiving surface of any of the radial bearings 37, there is no fear of direct contact between the associated rotor shaft 33a or 34a and the metal of the radial bearing 37 because the surface of the radial bearing 37 is covered with PEEK. Thus, in the oil cooled screw compressor 31 having the radial bearings 37 of the above construction, unlike the conventional oil cooled screw compressor, there is no fear of occurrence of any mechanical trouble caused by the foaming such as galling or scratching of the rotor shaft 33a or 34a and the radial bearings 37.

A description will now be given of the operation of the oil cooled screw compressor 31 having the thrust bearings 39 constructed as above. Oil after separation and recovery from discharge gas through the oil supply pipe 43 is fed as lubricating oil to the thrust bearings 39 through the oil influx/efflux space 42. Even if foaming occurs in the oil due to pressure reduction and there occurs breaking of an oil film on the pressure receiving surface of any of the thrust bearings 39, the thrust member 38 and the metal of the thrust bearing 39 do not come in contact with each other directly because the surface of the thrust bearing 39 is covered with a layer of PEEK. Thus, in the oil cooled screw compressor 31 having the thrust bearings 39 of the above construction, unlike the conventional oil cooled screw compressor, there is no fear of occurrence of any mechanical trouble caused by the foaming such as galling or scratching of the thrust members 38 and the thrust bearings 39.

In the oil cooled screw compressor 31 of this fourth embodiment, as described above, an orifice is not disposed in the oil return pipe 44 although an orifice 43a is disposed in the oil supply pipe 43 which is for supplying-oil to the thrust bearings 39. Consequently, the pressure of the oil present within the oil influx/efflux space 42 becomes a pressure level close to the suction pressure of a small-sized oil pump, so that the amount of oil leaking between the seal 42a and the rotor shafts 33a, 34a becomes smaller. Thus, according to the oil cooled screw compressor 31 of this fourth embodiment, a small amount of oil to be replenished suffices and the oil pump disposed in the oil supply pipe 43 may be a small-sized one. These points bring about such an economical effect as an advantage accrues in equipment cost of the oil cooled screw compressor.

Figure 16:
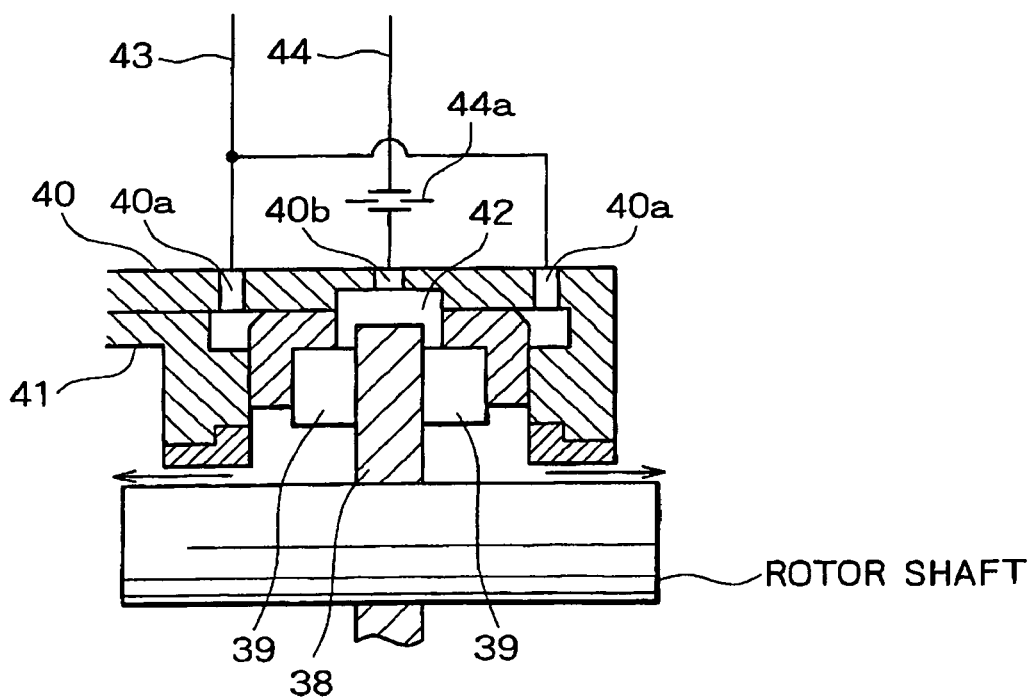
FIG. 16 is a schematic explanatory diagram showing another example of a lubricating construction for the thrust bearings in the oil cooled screw compressor of the fourth embodiment.
Figure 17:
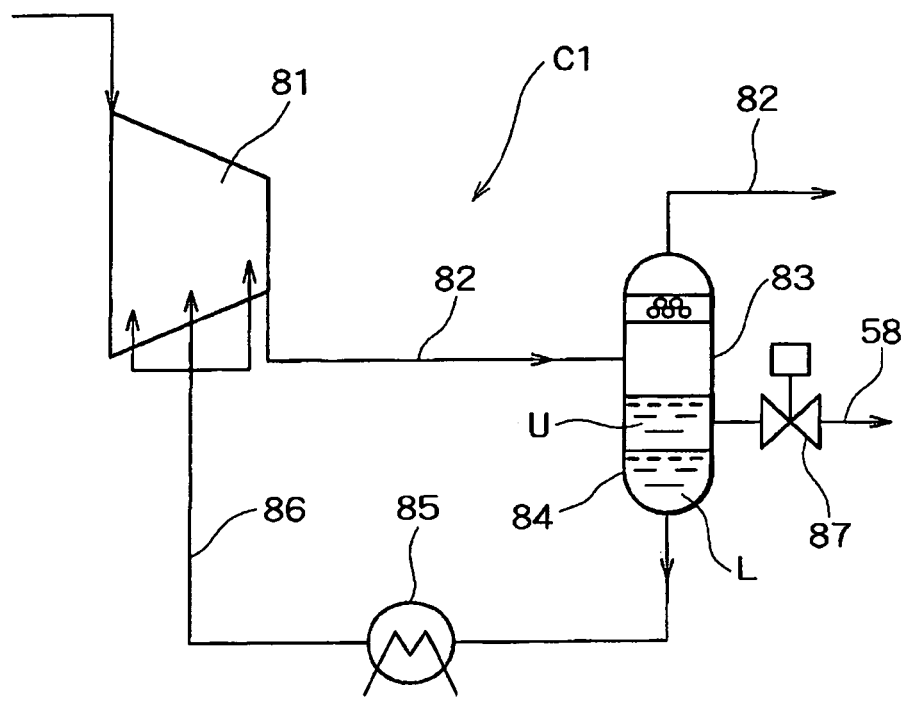
FIG. 17 is a schematic explanatory diagram showing the whole of a conventional oil cooled screw compressor.
Figure 18:
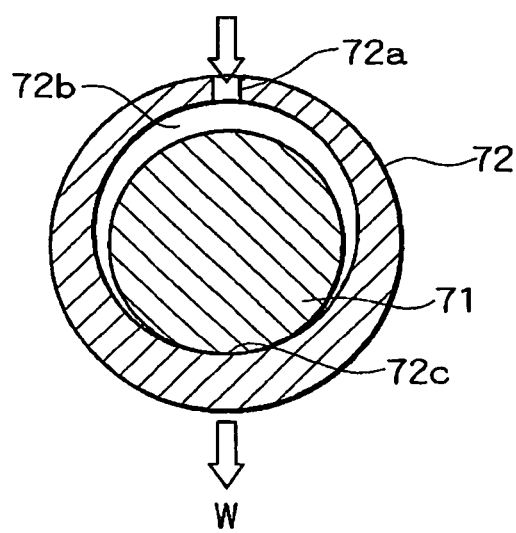
FIG. 18 is an explanatory diagram showing in what state a rotor shaft is fitted in a radial bearing.

In the oil cooled screw compressor 31 of this fourth embodiment, as described above, an orifice is disposed in the oil supply pipe 43, while no orifice is disposed in the oil return pipe 44. However, there may be adopted such a construction as in FIG. 16 which is a schematic explanatory diagram showing another constructional example for lubricating thrust bearings, no orifice is disposed in the oil supply pipe 43, while an orifice 44a is disposed in the oil return pipe 44. According to this construction, there is obtained an effect that the internal oil pressure of the oil influx/efflux space 42 becomes a pressure level dose to the discharge pressure and foaming is difficult to occur in the oil. However, the amount of oil leaking between the seal 42a and the rotor shafts 33a, 34a becomes larger, with a consequent increase in the amount of oil replenished, thus giving rise to the necessity of disposing a large-sized oil pump in the oil supply pipe 43.

Further, such a temperature detecting mechanism as shown in the first to third embodiments may be added to the radial bearings 37 and/or the thrust bearings 39 in the oil cooled screw compressor 31 of the fourth embodiment.

A radial bearing according to a fifth embodiment of the present invention will be described below with reference to the drawings. A perspective view of this embodiment is the same as FIG. 2 and a sectional view thereof is as shown in FIG. 19.

Figure 19:
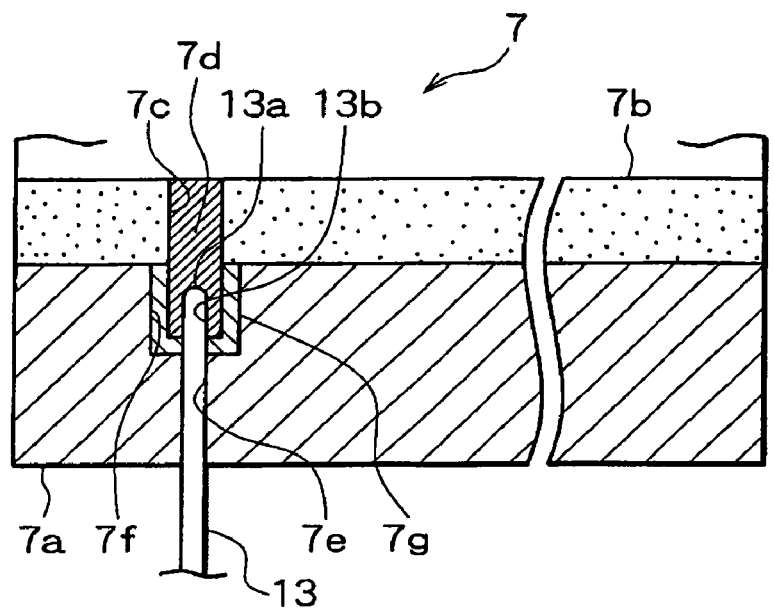
FIG. 19 is a sectional view of a radial bearing according to a fifth embodiment of the present invention.

In FIG. 19, components common to FIG. 3 are identified by the same reference numerals and explanations thereof will be omitted. Further, the operation of the radial bearing of this fifth embodiment is the same as that of the radial bearing of the first embodiment shown in FIGS. 2 and 3.

In FIG. 19, a bottomed hole-like space 7f which is opened to a resin layer 7b side is formed in a backing strip 7a of the radial bearing 7. A bottomed heat insulating member 7g having a hollow portion is fitted in the bottomed hole-like space 7f, the heat insulating member 7g being formed of, for example, alumina or a heat-resisting fluorine resin, more particularly Teflon (a registered trademark) or the like. In the radial bearing 7, a temperature measuring metallic member 7d formed of a white metal lower in melting point than the resin layer 7b is fitted through the resin layer 7b. Further, a temperature sensor 13 extends through a hole formed in a bottom member of the bottomed heat insulating member 7g and a temperature sensing portion (a tip portion) 13a of the temperature sensor 13 is in contact with inner periphery and bottom portions of a temperature sensing hole 13b formed in a front end face of the temperature measuring metallic member 7d.

According to the bearing of this fifth embodiment, the transfer of heat from the temperature measuring metallic member to the backing strip is prevented by the heat insulating member, so that the temperature of the bearing can be detected by the temperature sensor more accurately than by the bearing of the first embodiment.

Next, a modification of this fifth embodiment will be described below with reference to FIG. 20. The bearing of this modification shown in FIG. 20 is different in only the shape of a heat insulating member from the fifth embodiment shown in FIG. 19 and therefore only the different point will be described below.

Figure 20:
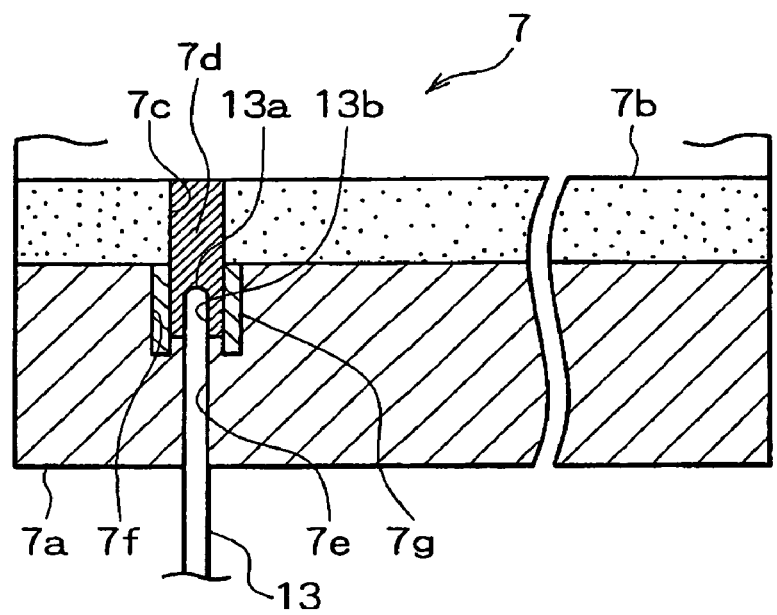
FIG. 20 is a sectional view of a radial bearing according to a modification of the fifth embodiment.

In FIG. 20, a heat insulating member 7g formed in a cylindrical shape is fitted in a bottomed hole-like space 7f. Centrally of a bottom portion of the bottomed hole-like space 7f is formed a projection and an end face of a temperature measuring metallic member 7d is in abutment against an upper surface of the projection.

According to the bearing shown in FIG. 20, the transfer of heat from the side face of the temperature measuring metallic member to the backing strip is prevented by the heat insulating member and therefore the temperature of the bearing can be detected by the temperature sensor more accurately than by the bearing of the first embodiment.

A radial bearing according to a sixth embodiment of the present invention will be described below with reference to the drawings.

Figure 21:
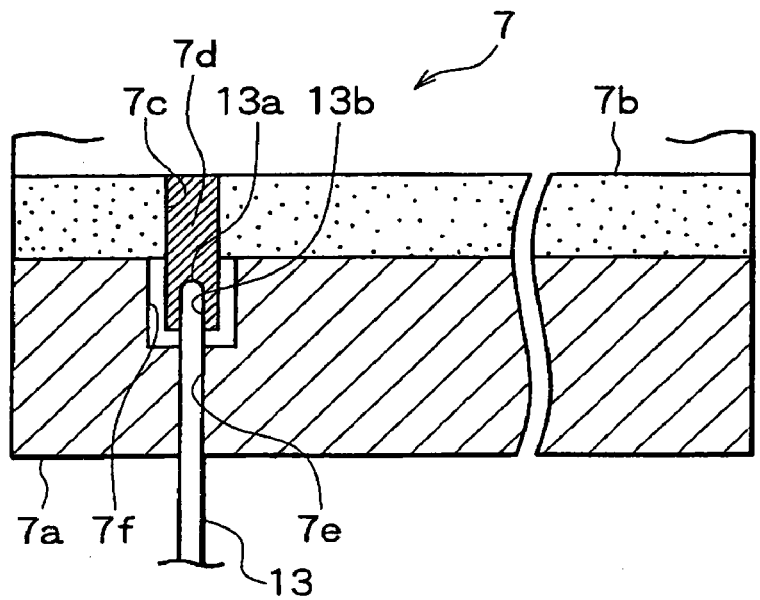
FIG. 21 is a sectional view of a radial bearing according to a sixth embodiment of the present invention.

In the fifth embodiment, as described above, the cylindrical heat insulating member 7g is fitted in the bottomed hole-like space 7f. However, no limitation is made thereto. For example, there may be adopted such a configuration as shown in FIG. 21, in which the heat insulating member 7g is not fitted in the bottomed hole-like space 7f, and no projection is formed centrally of the bottom of the bottomed hole-like space 7f, that is, the lower end side of the temperature measuring metallic member 7d is loosely fitted in the bottomed hole-like space 7f.

According to the bearing of this sixth embodiment, the transfer of heat from the temperature measuring metallic member to the backing strip is prevented by an air layer formed between the inner periphery surface of the hole-like space and the outer periphery surface of the temperature measuring metallic member, so that the temperature of the bearing can be detected by the temperature sensor more accurately than by the bearing of the first embodiment.

Figure 22:
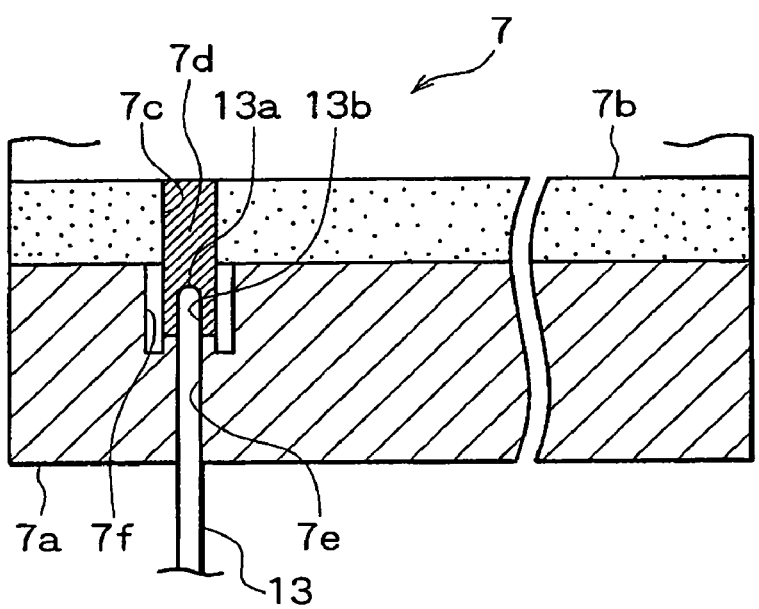
FIG. 22 is a sectional view of a radial bearing according to a modification of the sixth embodiment.

There also may be adopted such a configuration as shown in FIG. 22, in which a projection is formed centrally of the bottom of the bottomed hole-like space 7f and the end face of the temperature measuring metallic member 7d is put in abutment against the upper surface of the projection. According to this configuration, heat escapes from the opposite end face of the temperature measuring metallic member 7d to the backing strip 7a. Consequently, the temperature measurement accuracy is somewhat inferior to that in the configuration shown in FIG. 21. However, since the temperature measuring metallic member 7d is held positively, it is possible to eliminate the fear that the temperature measuring metallic member 7d may sink to the backing strip 7a side.

Figure 23:
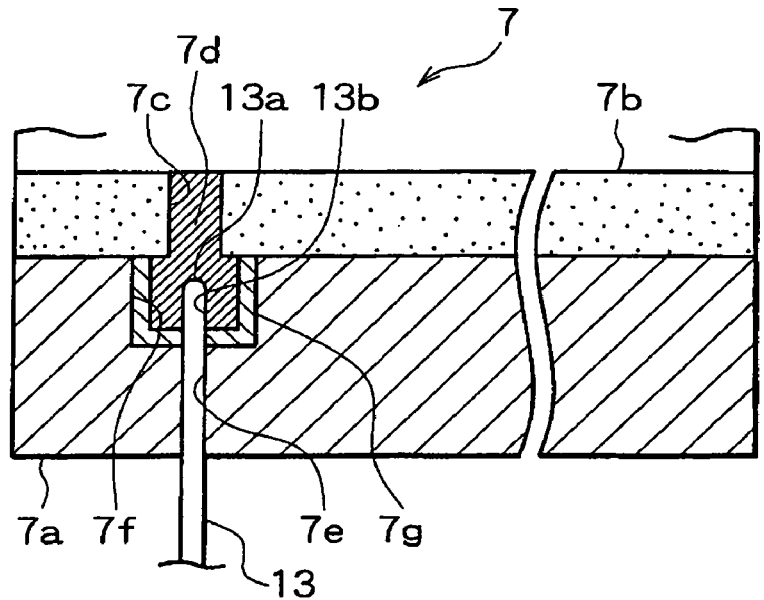
FIG. 23 is a sectional view of a radial bearing according to a seventh embodiment of the present invention.

Although in the above fifth and sixth embodiments the sectional shape of the temperature measuring metallic member is a substantially rectangular shape, no limitation is made thereto. For example, FIG. 23 is a sectional view of a radial bearing according to a seventh embodiment of the present invention. The configuration of this seventh embodiment is almost the same as that of the above fifth embodiment, but as is well understood from a comparison with FIG. 19, the sectional shape of the temperature measuring metallic member 7d used in the fifth embodiment is substantially rectangular, while that of a temperature measuring metallic member 7d used in this seventh embodiment is a substantially convex shape. That is, as in this seventh embodiment there may be adopted a configuration wherein the inside diameter of a heat insulating member 7g is made larger than the diameter of a fitting hole 7c which extends through a resin layer 7b and the sectional shape of the temperature measuring metallic member 7d is formed in a substantially convex shape so that the temperature measuring metallic member 7d is fitted in each of the fitting hole 7c and the heat insulating member 7g. Conversely, there may be adopted a configuration wherein the inside diameter of a heat insulating member 7g is made smaller than the diameter of a fitting hole 7c which extends through the resin layer 7b and a temperature measuring metallic member 7d having a substantially convex-shaped section is fitted into both the fitting hole 7c and the heat insulating member 7g in a vertically inverted state from FIG. 23.

Figure 24:
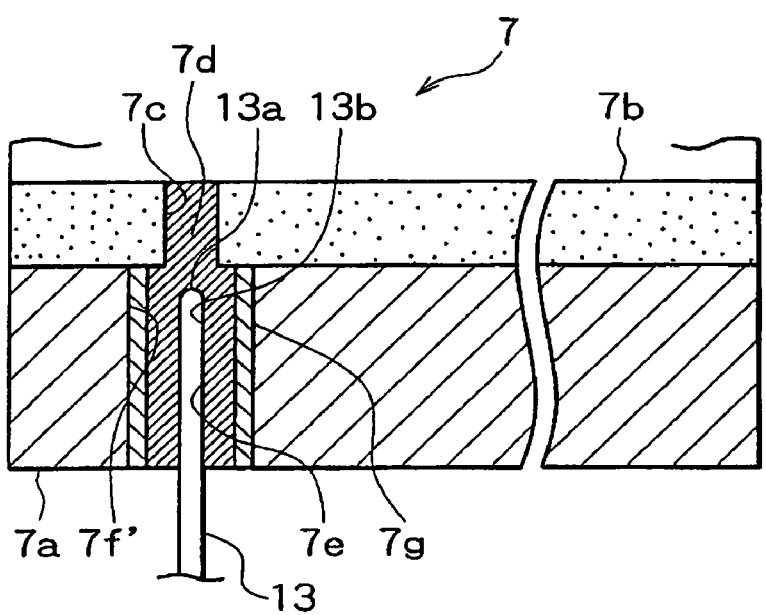
FIG. 24 is a sectional view of a radial bearing according to an eighth embodiment of the present invention.

Further, as to the bearings each provided with a heat insulating member in the above fifth and sixth embodiments, the backing strip is formed with a bottomed hole-like space for allowing the heat insulating member to be fitted therein. However, the present invention is not limited thereto. For example, FIG. 24 is a sectional view of a radial bearing according to an eighth embodiment of the present invention. The configuration of this eighth embodiment is almost the same as that of the above fifth embodiment, but as is well understood from a comparison with FIG. 19, in the fifth embodiment a bottomed hole-like space for fitting therein of the heat insulating member 7g is formed in the backing strip 7a, while in this eighth embodiment a bottomless hole-like space 7f' is provided and a heat insulating member 7g formed in a cylindrical shape is fitted in the hole-like space 7f'. According to the configuration of this eighth embodiment, as in the previous seventh embodiment, the inside diameter of the heat insulating member 7g is made larger than the diameter of a fitting hole 7c which extends through a resin layer 7b and a temperature measuring metallic member 7d is formed to have a substantially convex sectional shape.

A thrust bearing according to a ninth embodiment of the present invention will be described below with reference to the drawings. A perspective view of this embodiment is the same as FIG. 5 and a sectional view thereof is shown in FIG. 25.

Figure 25:
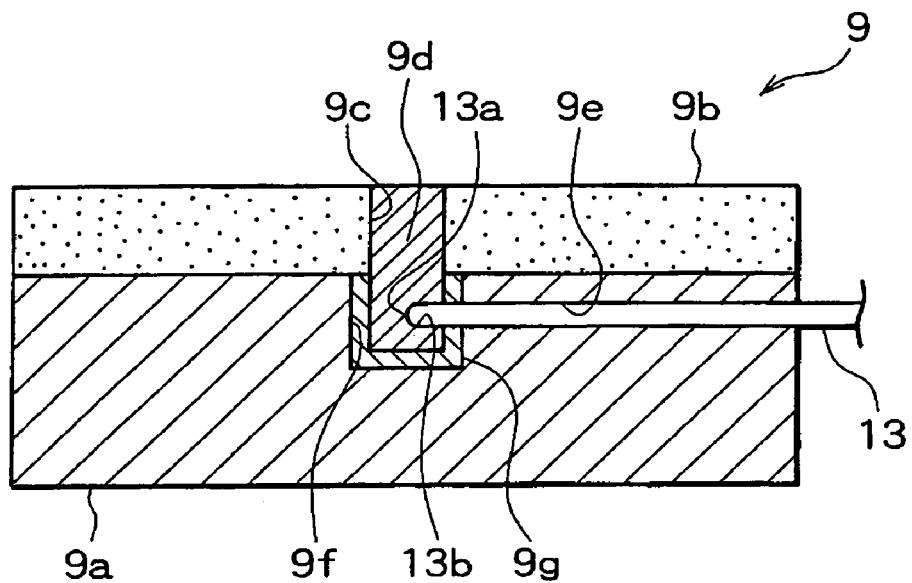
FIG. 25 is a sectional view of a thrust bearing according to a ninth embodiment of the present invention.

In FIG. 25, components common to FIG. 6 are identified by the same reference numerals and explanations thereof will be omitted. The operation of the thrust bearing of this ninth embodiment is the same as that of the thrust bearing of the first embodiment shown in FIGS. 5 and 6.

In FIG. 25, a bottomed hole-like space 9f which is opened to a resin layer 9b side is formed in a backing strip 9a of the thrust bearing 9 and a bottomed heat insulating member 9g having a hollow portion is fitted in the bottomed hole-like space 9f, the heat insulating member 9g being formed of, for example, alumina or a heat-resisting fluorine resin, more particularly Teflon (a registered trademark) or the like. A temperature sensor 13 is disposed so as to extend through a hole formed in a cylindrical portion of the bottomed heat insulating member 9g and a temperature sensing portion (a tip portion) 13a of the temperature sensor 13 is in contact with both inner periphery and bottom portions of a temperature sensing hole 13b formed in a side face of the temperature measuring metallic member 9d. According to such a configuration the temperature of the temperature measuring metallic member 9d can be detected directly.

A modification of the ninth embodiment will be described below with reference to FIG. 26.

Figure 26:
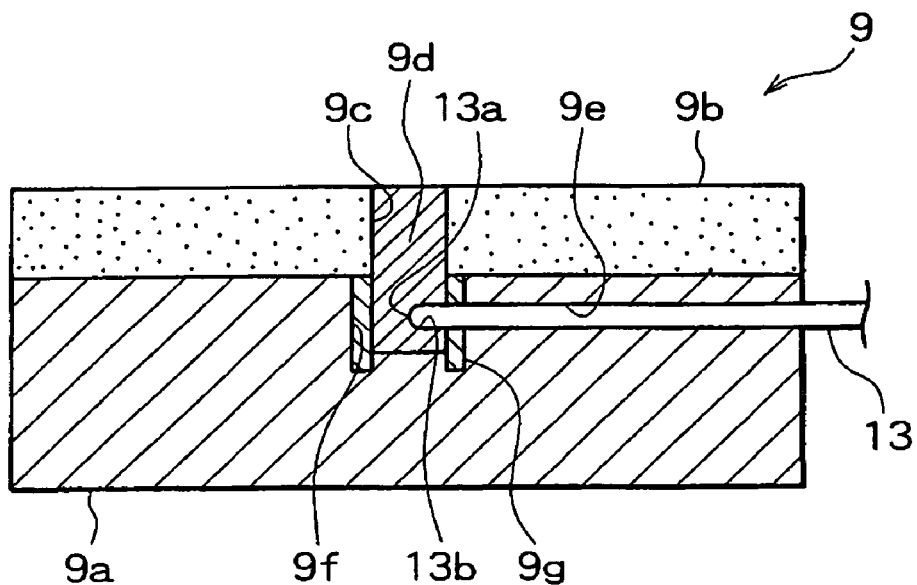
FIG. 26 is a sectional view of a thrust bearing according to a modification of the ninth embodiment.

In FIG. 26, a cylindrical heat insulating member 9g formed of, for example, alumina or a heat-resisting fluorine resin, more particularly, Teflon (a registered trademark) or the like, is fitted in a bottomed hole-like space 9f. An end face on one end side of a temperature measuring metallic member 9d is flush with the resin layer, while an opposite end side of the temperature measuring metallic member 9d is fitted in a hollow portion of the heat insulating member 9g and is in abutment against an upper surface of a projection projecting centrally of a bottom portion of the bottomed hole-like space 9f. A temperature sensor 13 is installed in the same manner as in the configuration shown in FIG. 25.

According to the configuration shown in FIG. 26, as described above, an end face of the temperature measuring metallic member 7d or 9d is in abutment against the upper surface of the projection projecting centrally of the bottom of the bottomed hole-like space 9f through the backing strip 7a or 9a, so that heat escapes from the temperature measuring metallic member 7d or 9d to the backing strip 7a or 9a side. Therefore, this configuration is inferior in both measurement sensitivity and measurement accuracy to the configuration shown in FIG. 25. However, since the temperature measuring metallic member 7d or 9d is made of a white metal and is much superior in thermal conductivity to the resin layer, the bearing of this configuration is fully applicable to practical use.

The vicinity of the temperature measuring portion of the thrust bearing of the ninth embodiment described above may be configured like the radial bearing shown in section in FIG. 21 or FIG. 22.

The invention claimed is:

1. A screw compressor comprising:
a casing;
a pair of female and male screw rotors meshed with each other and housed within said casing;
radial bearings mounted in sliding contact with rotor shafts of said pair of female and male screw rotors to undergo radial forces transmitted thereto from said rotor shafts; and
thrust bearings disposed on both sides of a disc-like thrust member, said disc-like thrust member being fitted on one of the rotor shafts of each of said pair of female and male screw rotors, to undergo a thrust force transmitted from the associated screw rotor to said thrust member,
wherein at least one of said radial bearings and said thrust bearings each comprise:
a backing strip;
a slide member comprising a resin layer and bonded to said backing strip, said bearing undergoing a force through said resin layer;
a temperature measuring metallic member, said temperature measuring metallic member being fitted in a fitting hole which is formed from said resin layer side and has a depth exceeding the thickness of the resin layer; and
a temperature sensor for measuring a temperature corresponding to the temperature of said temperature measuring metallic member, said temperature sensor being fitted in a hole formed in said backing strip.

2. A screw compressor comprising:
a casing;
a pair of female and male screw rotors meshed with each other and housed within said casing;
radial bearings mounted in sliding contact with rotor shafts of said pair of female and male screw rotors to undergo radial forces transmitted thereto from said rotor shafts; and
thrust bearings disposed on both sides of a disc-like thrust member, said disc-like thrust member being fitted on one of the rotor shafts of each of said pair of female and male screw rotors, to undergo a thrust force transmitted from the associated screw rotor to said thrust member,
wherein said thrust bearings each comprise:
a resin bearing, said resin bearing comprising a backing strip and a slide member formed by a resin layer and bonded to said backing strip;
a metallic bearing, said metallic bearing comprising a backing strip and a sliding metallic member bonded to said backing strip;
a temperature sensor for measuring a temperature corresponding to the temperature of said sliding metallic member, said temperature sensor being fitted in a hole formed in said backing strip of said metallic bearing; and
a bearing holding member,
wherein a plurality of bearing fitting recesses are formed at equal intervals on a circle having a radius centered on the center of said bearing holding member, and said resin bearing and said metallic bearing are fitted mixedly in said bearing fitting recesses.

3. A screw compressor comprising:
a casing;
a pair of female and male screw rotors meshed with each other and housed within said casing;
radial bearings mounted in sliding contact with rotor shafts of said pair of female and male screw rotors to undergo radial forces transmitted thereto from said rotor shafts;
thrust bearings disposed on both sides of a disc-like thrust member, said disc-like thrust member being fitted on one of the rotor shafts of each of said pair of female and male screw rotors, to undergo a thrust force transmitted from the associated screw rotor to said thrust member; and
an oil supply means for supply oil after separation and recovery from discharge gas compressed by said screw rotors as lubricating oil to said radial bearings and said thrust bearings,
wherein at least one of surfaces of said radial bearings opposed to the rotor shafts and surfaces of said thrust bearings opposed to said thrust member are covered with a resin material.

4. The screw compressor according to claim 3, wherein said resin material is polyether ether ketone.

5. The screw compressor according to claim 3, wherein said oil supply means comprises an oil supply pipe for the supply of oil to said thrust bearings and an oil return pipe for returning oil from said thrust bearings to a gas compressing chamber formed by said pair of screw rotors and said casing, with an orifice being formed in said oil supply pipe.

6. The screw compressor according to claim 3, wherein said oil supply means comprises an oil supply pipe for the supply of oil to said thrust bearing and an oil return pipe for returning oil from said thrust bearings to a gas compressing chamber formed by said pair of screw rotors and said casing, with an orifice being formed in said oil return pipe.

7. The screw compressor according to claim 3, wherein said bearings covered with the resin material each comprise:
a temperature measuring metallic member, said temperature measuring metallic member being fitted in a fitting hole which is formed from said resin layer side and has a depth exceeding the thickness of said resin layer; and
a temperature sensor for measuring a temperature corresponding to the temperature of said temperature measuring metallic member, said temperature sensor being fitted in a hole formed in said backing strip.

* * * * *